United States Patent
Iino et al.

(10) Patent No.: US 6,570,294 B1
(45) Date of Patent: May 27, 2003

(54) ULTRASONIC MOTOR AND ULTRASONIC MOTOR-EQUIPPED ELECTRONIC APPLIANCE

(75) Inventors: Akihiro Iino, Chiba (JP); Masao Kasuga, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/323,504

(22) Filed: Jun. 1, 1999

(51) Int. Cl.$^7$ ................................................ H02N 2/00
(52) U.S. Cl. .................................. 310/316.01; 310/317
(58) Field of Search ............................ 310/316.01, 317

(56) References Cited

U.S. PATENT DOCUMENTS

| | | | |
|---|---|---|---|
| 3,989,042 A | * 11/1976 | Mitsui et al. ................. 310/317 |
| 4,271,371 A | * 6/1981 | Furuichi et al. ........ 310/316.01 |
| 4,277,758 A | * 7/1981 | Mishiro .................. 310/316.01 |
| 4,594,526 A | * 6/1986 | Araki et al. ................. 310/317 |
| 4,954,741 A | * 9/1990 | Furutsu et al. ......... 310/316.01 |
| 4,965,532 A | * 10/1990 | Sakurai .................. 310/316.01 |
| 5,233,274 A | * 8/1993 | Honda et al. .......... 310/316.01 |
| 5,237,237 A | * 8/1993 | Ueda et al. ................. 310/317 |
| 5,416,374 A | * 5/1995 | Inoue et al. ............ 310/316.01 |
| 5,425,704 A | * 6/1995 | Sakurai et al. ................. 604/22 |
| 5,462,604 A | * 10/1995 | Shibano et al. ......... 310/316.01 |
| 5,734,236 A | * 3/1998 | Motegi ........................ 310/317 |
| 5,811,909 A | * 9/1998 | Wuchinich .............. 310/316.01 |
| 5,841,215 A | * 11/1998 | Takeishi ................. 310/316.01 |
| 5,945,769 A | * 8/1999 | Mitarai et al. ............... 310/317 |
| 5,969,464 A | * 10/1999 | Hakano et al. ......... 310/316.01 |
| 6,064,140 A | * 5/2000 | Zumeris ................. 310/323.02 |

FOREIGN PATENT DOCUMENTS

SU    1597234 A1 * 10/1990  ............ 310/316.01

* cited by examiner

*Primary Examiner*—Thomas M. Dougherty
(74) *Attorney, Agent, or Firm*—Adams & Wilks (57) ABSTRACT

The present invention discloses an ultrasonic motor and an electronic appliance equipped with the ultrasonic motor, wherein an input signal to a control circuit which is a command signal for driving a moving body of the ultrasonic motor or a driven body driven in response to the moving body is restricted by a signal processing circuit. The frequency component of the input signal equal to or exceeding a specified frequency is cut by means of a filter circuit or an output from a control circuit is controlled in response to a fluctuation width thereof.

24 Claims, 9 Drawing Sheets

ULTRASONIC MOTOR AND ULTRASONIC MOTOR-EQUIPPED ELECTRONIC APPLIANCE

BACKGROUND OF THE INVENTION

1. Field of the Invention

The present invention relates to an ultrasonic motor and an electronic appliance equipped with an ultrasonic motor, and more particularly to an ultrasonic motor capable of controlling a drive of a moving body.

2. Description of the Related Art

An actuator employed as a drive source for various electronic appliances constitutes an essential element as drive means of a driven body. Generally, an electromagnetic type actuator including a magnet and a coil has been popularly employed. For example, a cross coil type actuator, a voice coil type actuator, or a stepping motor or the like has been used for an angular control of an indicator or a mirror to control the movement of a fixed angle and for driving of a driven body of a pick up (head) of a n information appliance.

Recently, an electomagnetic type actuator has attracted attention as an actuator based on a new principle and its application to various appliances including an indication instrument has been proposed as shown in Japanese Patent Publication Hei 4-64598, for example.

However, in case the electromagnetic type actuator is used, there has been a problem in that the actuator shows a poor response characteristic and a small holding torque and hence, a precision of a position control of the driven body in response to a dynamic input is deteriorated or the fluctuation of the position occurs due to an external vibration or the like. Furthermore, to hold the actuator at a specified position, it is necessary to keep an electric current to continue its flow. Accordingly, the current consumption is increased and heat is generated and hence, the use of the actuator in a vacuum becomes difficult. Furthermore, the actuator is liable to receive the influence of magnetism and generates magnetism by itself so that there arise problems such that the use of the actuator in a magnetic field is difficult and the actuator cannot be disposed in the vicinity of a magnetic medium or the like which dislikes magnetism. Furthermore, the actuator still has other problems in that the torque thereof is small and the miniaturization of the actuator is difficult in view of problems based on the operating principle and the construction, thus making an appliance equipped with the actuator to become large-sized.

Recently, in place of the above-mentioned electromagnetic type actuator, an ultrasonic motor has been used.

Figure 4:
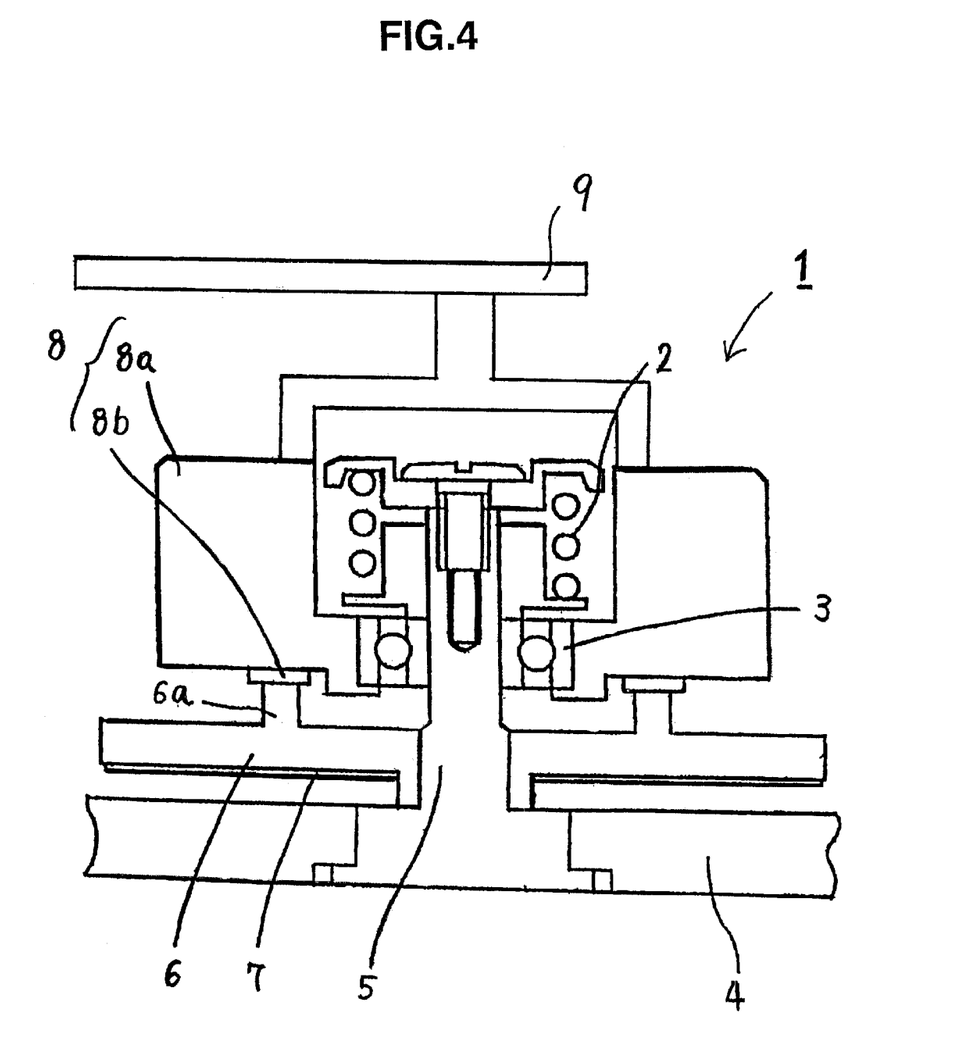
FIG. 4 is a cross-sectional view showing the construction of an ultrasonic motor.

FIG. 4 shows the construction of such an ultrasonic motor.

As shown in FIG. 4, a disc-like vibrating body 6 is supported by a central shaft 5 which has its center fixedly secured to a support plate 4. The vibrating body 6 has a first surface thereof adhered to a piezoelectric element 7 and a second surface thereof provided with protrusions 6a which enlarge a vibration displacement of the vibrating body 6 and gives a rotating force to a moving body 8. A bearing 3 is mounted on the central portion of the moving body 8 and its center is guided by the central shaft 5. Furthermore, by pressurizing an inner race of the bearing 3 with a spring member 2, a contact pressure is generated between the protrusions 6a of the vibrating body 6 and a friction member 8a of the moving body 8. A vibrating wave excited in the vibrating body 6 due to the piezoelectric effect of the piezoelectric element 7 is converted to a rotational force of the moving body 8 by way of a friction force. A driven body 9 is fixedly secured onto the moving body 8 by means of an adhesion or a screwing and hence, the driven body 9 is driven corresponding to the rotation of the moving body 8.

This ultrasonic motor also has problems in that its lifetime is short because of a friction driving, the reliability of the actuator at the time of starting is low, and the response characteristic is sometimes excessively fast so that vibration is generated by noise or the like associated with a control signal. In particular, in a rotary-type ultrasonic motor with a moving body having a rotating angle of less than 360 degrees or in a linear-type ultrasonic motor, the contact range between the vibrating body and the moving body is restricted and hence, a biased wear is produced thus facilitating the deterioration of the motor characteristics. In this case, a start position, namely, an origin, an operation end point, and positions where a stop frequency is extremely high define wear boundaries so that the starting is deteriorated and the accuracy of position control is lowered. Furthermore, there is a problem in that a frequency tracking circuit becomes an inevitable requirement and it is necessary to make the phase difference of two signals vary at the time of changing the direction of the rotation to either a normal direction or a reverse direction and hence, a drive circuit becomes complicated and a circuit mounting portion becomes large-sized and expensive.

SUMMARY OF THE INVENTION

The present invention is provided for performing a drive control of a driven body using an ultrasonic motor as a drive source of an electronic appliance, wherein the ultrasonic motor is stopped at specified positions without consuming electric current and almost receiving no adverse influence of external vibration or the like by making use of a large holding torque which is a feature of the ultrasonic motor during a non-energized period. Furthermore, no heat is generated at this time, and the ultrasonic motor can be used in vacuum. Still furthermore, the ultrasonic motor does not receive the adverse influence of magnetism and does not generate magnetism by itself and hence, the ultrasonic motor is used in a magnetic field and enables the driving of a magnetic recording medium or its detection pick-up which dislikes magnetism without limiting a position or an arrangement of the ultrasonic motor.

In particular, an input signal transmitted to a control circuit which constitutes a drive command signal is made not to respond to noise components of the input signal in such a manner that frequency components which are equal to or exceed a specified frequency are eliminated by making the input signal pass through a filter, or the input signal is made not to respond to a minute fluctuation value, or the input signal takes on a mean value of the input signals. Accordingly, the vibration of a control system can be restricted in such a manner that a feature of the ultrasonic motor is that it exhibits high response characteristics and does not bring about any adverse effect to the contrary. Simultaneously, any unnecessary operation is eliminated so that wear of a contact portion between the vibrating body and the moving body is reduced thus prolonging the lifetime of the ultrasonic motor.

Furthermore, by intentionally making the ultrasonic motor be driven in a range larger than a drive range, the influence of the biased wear in the drive range is minimized, thus preventing deterioration of starting performance and lowering of an accuracy of position control.

Still furthermore, by varying the voltage or the frequency of the drive signal at the time of starting or stopping the ultrasonic motor, the amplitude of the vibrating body is gradually increased or decreased so that the wear of the contact portion between the moving body and the vibrating body by a sudden start or a sudden stop of the moving body is reduced thus prolonging the lifetime of the ultrasonic motor.

DETAILED DESCRIPTION OF THE PREFERRED EMBODIMENTS

Hereinafter, embodiments to which the present invention is applied are explained in conjunction with FIG. 1 to FIG. 9. An ultrasonic motor shown in embodiments has substantially the same construction as that of the ultrasonic motor which was explained in the view of FIG. 4 with the exception of parts which constitute the present invention. Accordingly, the same reference numerals are given to same parts and their detailed explanation is omitted.
(First Embodiment)

Figure 1:
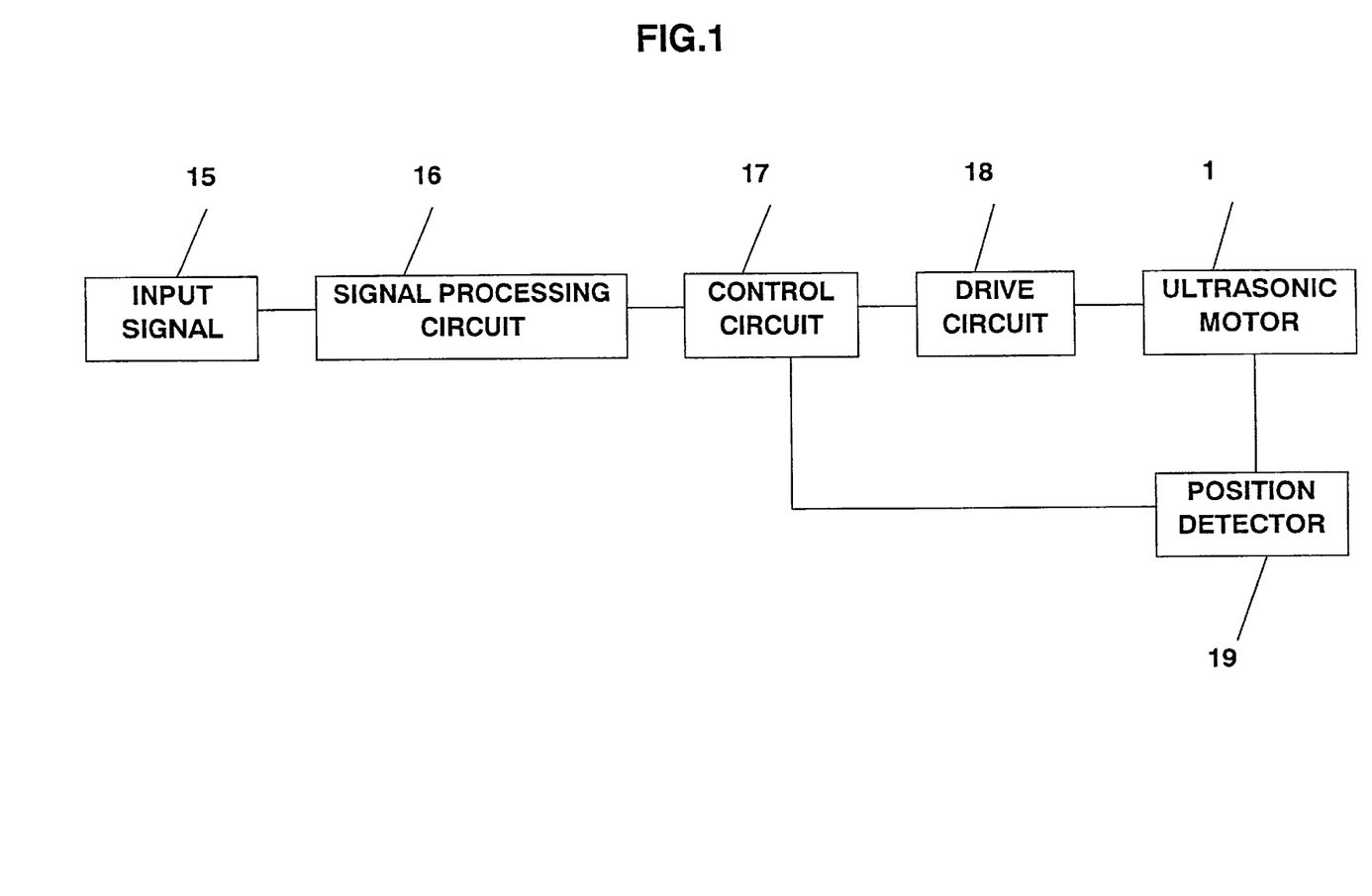
FIG. 1 is block diagram showing a drive system using an ultrasonic motor of the present invention.

FIG. 1 shows a block diagram of the first embodiment of an ultrasonic motor to which the present invention is applied.

In FIG. 1, an input signal 15 which designates the movement of a moving body of an ultrasonic motor 1 driven by a drive signal from a drive circuit or the movement of a vibrating body in case the ultrasonic motor is of a type such as a linear type ultrasonic motor which has a self-propelled vibrating body is supplied to a control circuit 17. Upon receiving the input signal 15, the control circuit 17 compares the input with an information transmitted from a position detector 19 such as encoder or a potentiometer and outputs a control signal which issues a command for a start, a stop, a normal rotation, a reverse rotation or the like to a drive circuit 18. Upon receiving the control signal, the drive circuit 18 inputs a drive signal to the moving body or the vibrating body of the ultrasonic motor 1 in response to the command signal. Succeeding this flow of control, the moving body 8 or the self-propelled vibrating body of the ultrasonic motor 1 is moved to a designated position in response to the input signal 15. Here, the present invention is characterized by inserting a signal processing circuit 16 between the input signal 15 and the control circuit 17.

The manner of operation of the signal processing circuit 16 is explained hereinafter.

Figure 2A:
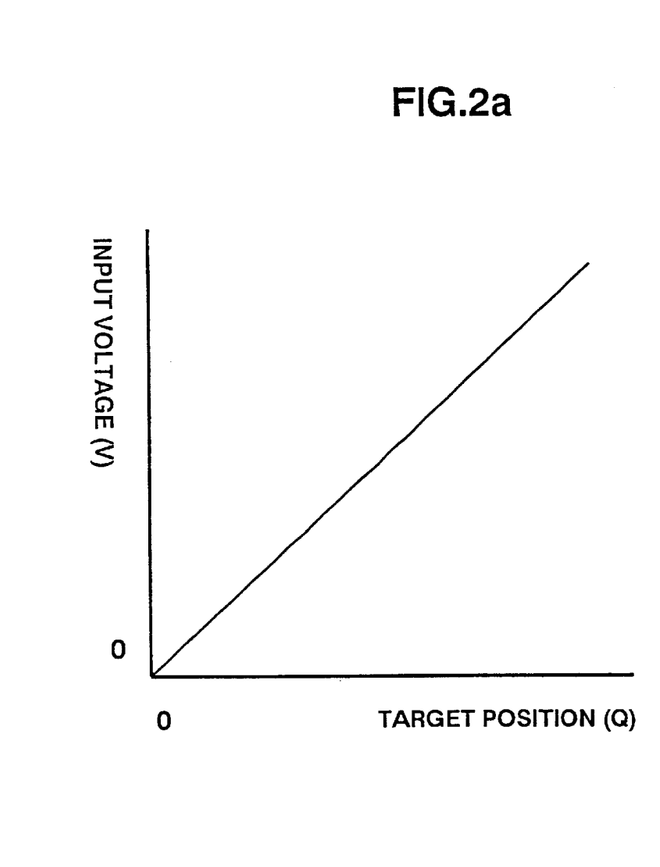
FIGS. 2a and 2b are an explanatory view showing an example of an input signal of the drive system using an ultrasonic motor of the present invention.
Figure 2B:
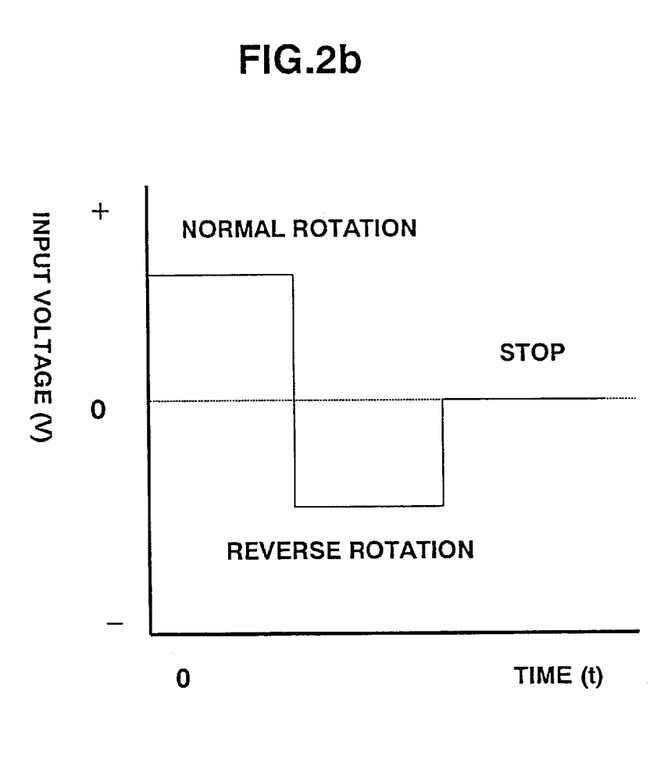

As the input signal 15, the input signal 15 shown in FIG. 2(a) where the movement is designated in proportion to the magnitude of the input signal 15, or the input signal shown in FIG. 2(b) where only the moving direction, stop or start of the moving body 8 is designated, or an alternating current signal not shown in drawings which designates the position in response to its frequency or the like is considered.

Here, in case the input signal 15 requests an excessive degree of control which exceeds a standard of a product or the input signal carries a noise signal, the feature of the ultrasonic motor 1 in that the motor has rapid response characteristics generates adverse effects such as the vibration of a control system or unnecessary operations to the contrary. For example, in case of an indicator, an operator cannot comfortably read the value when fluctuation which exceeds the human visibility occurs. Accordingly, by employing a filter circuit which cuts out unwanted components of the input signal 15 exceeding a specified frequency as the signal processing circuit 16, or by making the signal processing circuit 16 output the control signal only when the fluctuation width of the input signal 15 becomes equal to or exceeds a given value or by making the signal processing circuit 16 intermittently output the control signal in response to a mean value of a given number of sampled detected input signals 15, the vibration of the control system and unnecessary operations can be obviated. Accordingly, it has become possible to reduce the power consumption and to prolong the lifetime of the ultrasonic motor 1.

As examples which use the input signal of FIG. 2(a), a drive of a driven body such as a robot, a machine tool, an indicator, a mirror of a printer and the like are considered. As examples which use the input signal of FIG. 2(b), following cases where the input shown in the drawing is output in response to a direct information from a device which is driven by a moving body and is operated. The information may be a comparison of a quantity of light with a target quantity of light in case of an optical shutter or a stop, an information detected by a head in case of positioning of a head of an information appliance, and a sound volume or a quantity of light which varies corresponding to the variation of a variable electric element in case of positioning of the variable electric element. Accordingly, in performing the control using the signal shown in FIG. 2(b), the position detector 1 shown in FIG. 1 becomes unnecessary and positioning is performed based on the input signal.

Although the signal processing circuit 16 is inserted between the input signal 15 and the control circuit 17, the control circuit 17 may also perform the function of the signal processing circuit 16.
(Second Embodiment)

Figure 3A:
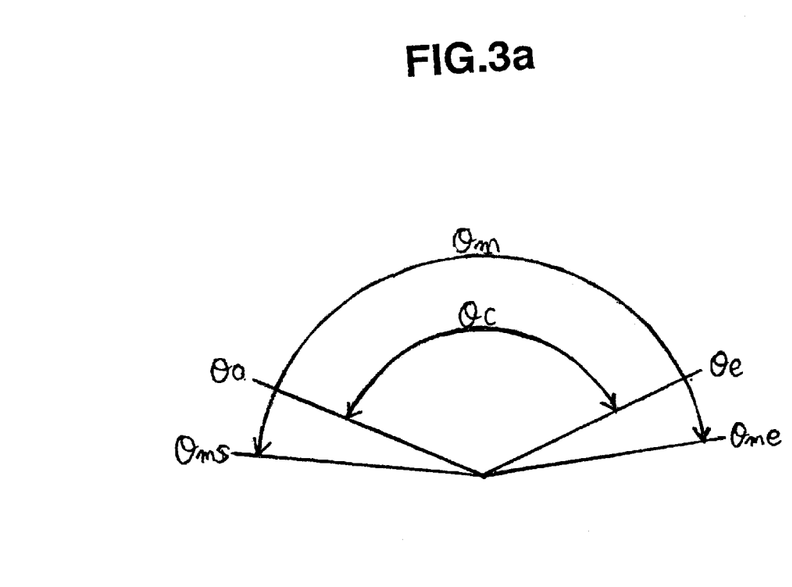
FIGS. 3a and 3b are an explanatory view showing a control range and an operation range at a drive system using an ultrasonic motor of the present invention.
Figure 3B:
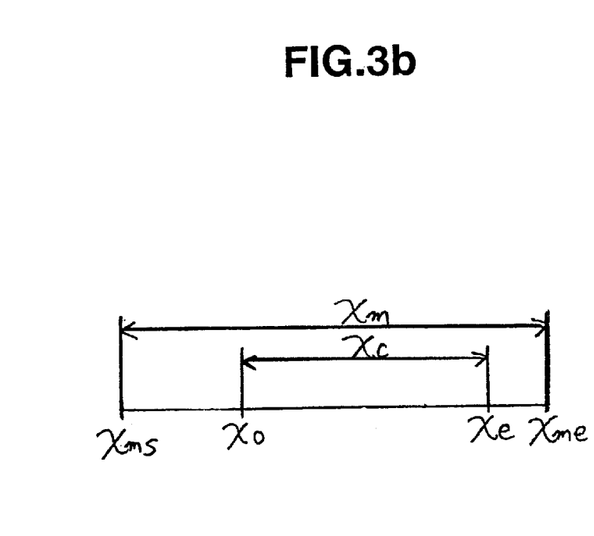

FIGS. 3(a), (b) indicate operating ranges of the embodiment of an ultrasonic motor to which the present invention is applied and they respectively correspond to a rotary type ultrasonic motor and a linear type ultrasonic motor.

Hereinafter, the explanation is made in conjunction with the drawing. In FIGS. 3(a), (b), drive ranges of a moving body 8 based on a input signal 15 are expressed as a moving angle θc ranging from θO to θe and a movement xc ranging from xO to xe, while possible operating ranges based on a control signal are expressed as a moving angle θm ranging from θms θo me and a movement xm ranging from xms to xme.

The second embodiment is characterized in that the possible operating ranges θm and xm are made greater than the drive ranges θc and xc. One of the main problems of the ultrasonic motor based on the friction drive is deterioration of performance due to wear of a contact portion between a vibrating body 6 and a moving body 8 based on poor durability. In particular, in case of the rotary type ultrasonic motor with a rotating angle less than 360 degrees and the linear type ultrasonic motor, the biased wear is liable to occur at the contact portion. Especially, in case of the rotary type ultrasonic motor where the operating angle is smaller than an angle defined between protrusions 6a, 6a which are provided on the vibrating body 6 and are brought into contact with the moving body 8 or in case of the linear type ultrasonic motor, non-worn portions are formed on the moving body 8 and boundaries between the worn portions and the non-worn portions are aligned with the starting position of the operation of the moving body 8 so that inconveniences such as lowering of starting performance or failure of starting are liable to occur. Accordingly, in this embodiment, by making the possible operating ranges θm and xm based on the output signal greater than the drive ranges θc and xc based on the input signal 15, the biased wear in the drive range caused by the input signal is attenuated and wear occurs over the entire operating range uniformly.

To explain in detail, for example, in case the moving body 8 is moved to a designated position from the reference position θO, xO based on the input signal 15 and the moving body 8 returns to the reference position θO, xO after the moving is finished or the power source is turned on, the moving body 8 moves in a direction opposite to the previous moving direction from the reference position θO, xO and then returns to the reference position θO, xO. Furthermore, at the time of returning to the reference position θO, xO, the moving body 8 moves in a direction opposite to the direction from the designated position to the reference position. Accordingly, the biased wear within the operating range caused by the input signal is reduced. By arbitrarily changing the magnitude of the possible operating range θm, xm, this effect or advantage becomes more apparent.

(Third Embodiment)

FIG. 5 shows an operation principle of an ultrasonic motor. A piezoelectric element 7 which is adhered to a vibrating body 6 is divided by each quarter wavelength in a circumferential direction and is polarized in a direction of thickness with the polarity reversed for every other divided portion 7a, 7b. Every other one of the electric patterns are electrically short-circuited thus constituting two groups of electrode patterns consisting of hatched portions 12a and the non-hatched portions 12b. The vibrating body 6 and the piezoelectric element 7 are adhered to each other in such a manner that protrusions 6a of the vibrating body 6 are exactly positioned at boundaries of the electrode patterns. An electrode 12c is provided to the entire adhered surface.

Figure 5A:
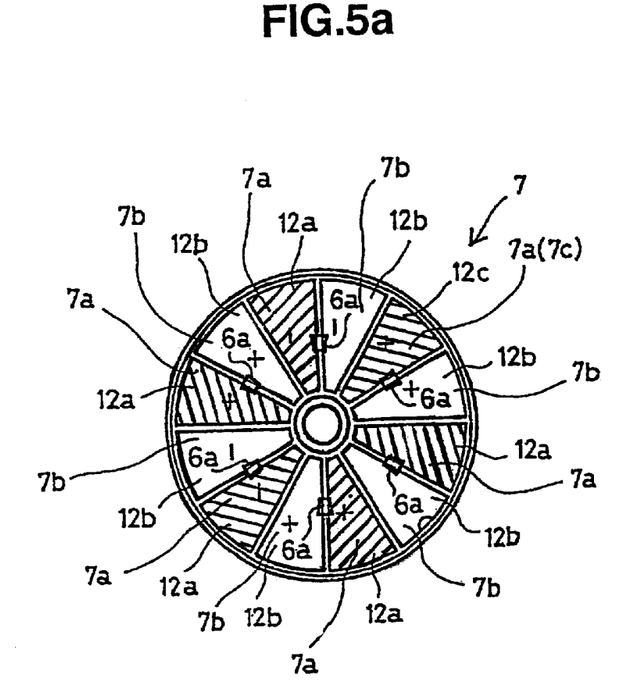
FIGS. 5a to 5e are an explanatory view showing an operation principle of an ultrasonic motor of the present invention.
Figure 5B:
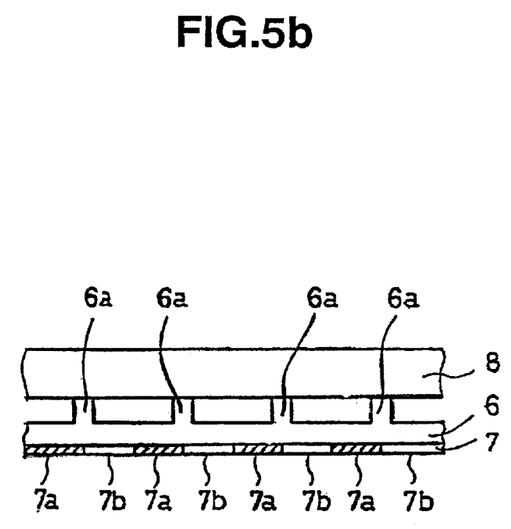
Figure 5C:
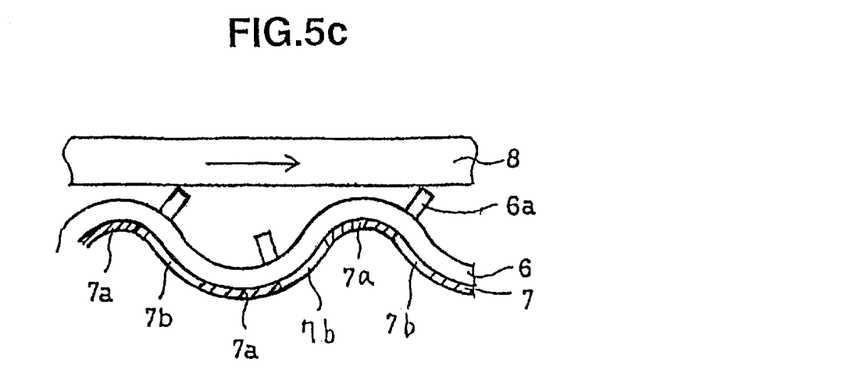
Figure 5D:
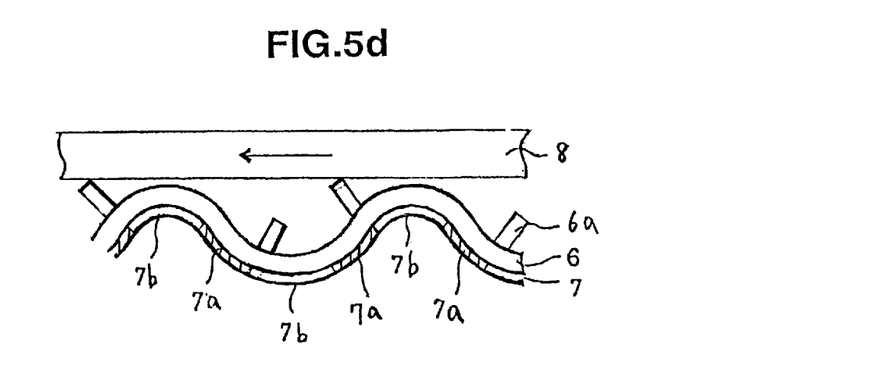
Figure 5E:
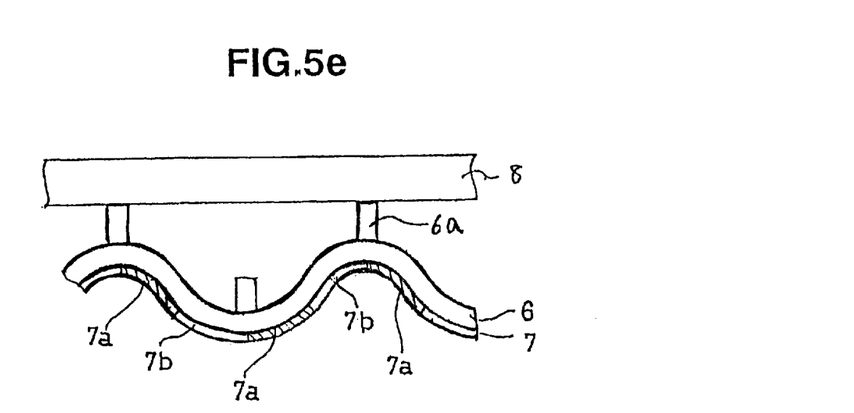

When a signal of a given frequency is applied to the hatched portions of the piezoelectric element, a standing wave is generated in the vibrating body 6 as shown in FIG. 5(c). Here, the lifted protrusion 6a is inclined to the right and the moving body 8 which comes into contact with protrusions 6a is moved to the right. This is referred to as 'operation 1' hereinafter. When the signal is applied to the group of patterns 12b which is depicted as the non-hatched portions, a standing wave is generated in the vibrating body 6 as shown in FIG. 5(d) and the moving body 8 is moved to the left at this time. This is referred to as 'operation 2' hereinafter. Furthermore, when the signal is applied to both electrode patterns 12a, 12b, a standing wave is generated as shown in FIG. 5(e). In this case, the protrusions 6a are displaced merely in an upward or downward direction and although the moving body 8 moves in neither left nor right direction, an apparent friction coefficient between the moving body 8 and the protrusion 6a is decreased. This is referred to as 'operation 3' hereinafter.

The drive control of this embodiment is explained hereinafter. First of all, the moving body 8 is moved in a normal direction toward a target position in accordance with the operation 1. However, even when the application of the signal is stopped at the target position, the vibration of the vibrating body 6 is not stopped instantly and the moving body 8 receives an influence of inertia and hence, the moving body 8 stops after exceeding the target position. After exceeding the target position, the moving body 8 is moved in accordance with the operation 2 and stopped at the target position. Alternately, after moving the moving body 8 in accordance with the operation 1, the operation 3 is performed just in front of the target position and the moving body 8 is stopped at the target position by intentionally adding a slip of the moving body 8. As a further method, the operation 2 is performed just in front of the target position and the moving body 8 is suddenly stopped. Furthermore, the above-mentioned signal applying patterns (operations 1, 2, 3) and respective signal applying times are combined or the amplitudes of signals are changed so that a high-precision and rapid position control is realized. Furthermore, the control of the rotational speed and the torque also is readily realized.

In this manner, by selecting the signal applying electrode patterns, three operations are possible and the high-precision and rapid position control is realized. Accordingly, compared to the conventional progressive wave type ultrasonic motor which changes the moving direction by varying the phase, the control circuit is simplified, the ultrasonic motor is miniaturized and the exchange of signal between the ultrasonic motor and the control appliances is simplified. However, the construction of the ultrasonic motor and the relationship between the piezoelectric element and the protrusions are not limited to those of this embodiment and are applicable to any ultrasonic motors which can generate different standing waves at a plurality of positions and is driven by these standing waves.

(Fourth Embodiment)

An example of the fourth embodiment of the present invention where an ultrasonic motor is driven and its drive is controlled by making use of a self-oscillating circuit is explained hereinafter. As explained in the third embodiment, using the ultrasonic motor of the present invention for a drive control, the drive circuit becomes simple and is miniaturized. In this embodiment, using the self-oscillating circuit as the drive circuit, the drive circuit is further miniaturized.

Figure 6:
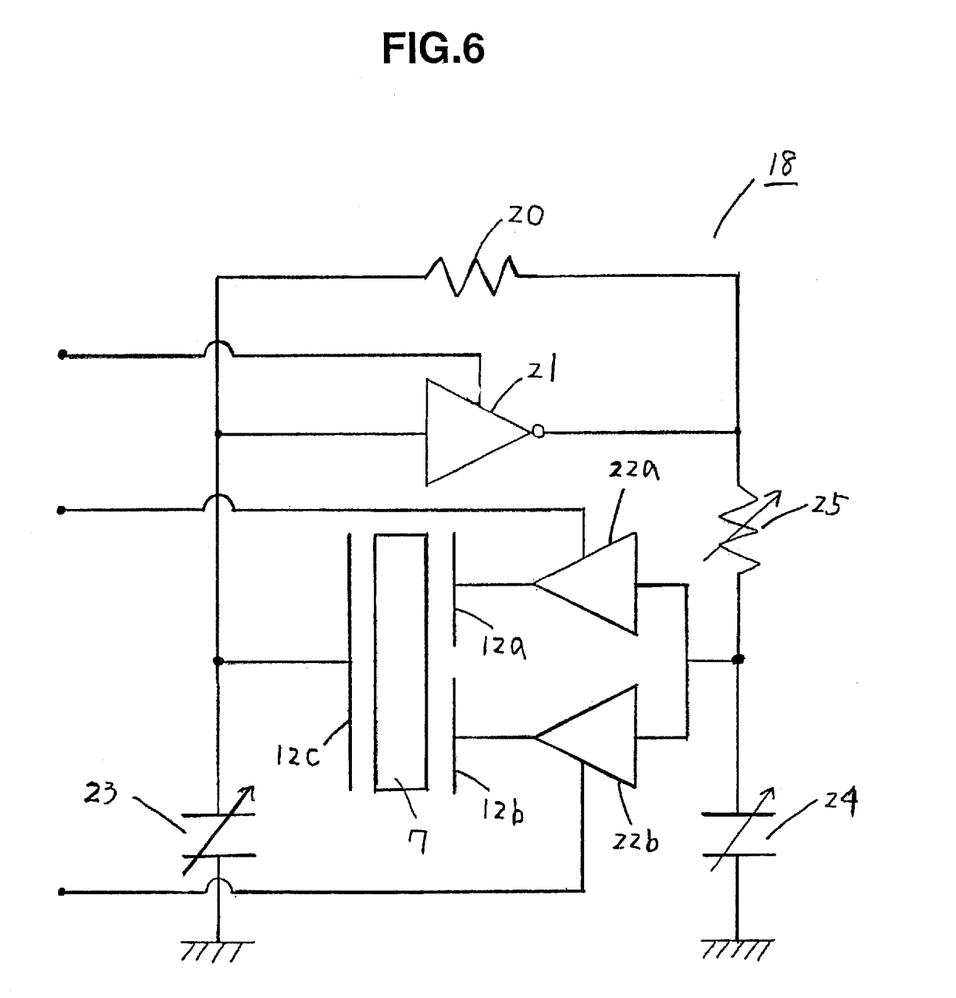
FIG. 6 is a circuit diagram showing a drive circuit of an ultrasonic motor of the present invention.

FIG. 6 shows a drive circuit 18 of an ultrasonic motor provided with a self-oscillating circuit. Here, the explanation of this embodiment is made based on the ultrasonic motor and its drive control which are explained in the third embodiment. Two buffers 22a, 22b are respectively independently connected to two groups of electrode patterns (hatched portions 12a and non-hatched portions 12b in FIG. 5). A vibrating body 6 to which an piezoelectric element 7 is adhered and two capacitors 23, 24 constitute a resonance circuit. An inversion amplifier circuit which is constituted by an inverter 21 and a resistor 20 inversely amplifies a signal from the resonance circuit and returns the signal to the resonance circuit thus generating an oscillation.

Here, the inverter 21 and two buffers 22a, 22b have a tri-state construction and depending on a signal inputted to a control terminal, an output terminal is changed to a high impedance condition, namely, the output signal is turned off.

For example, by turning on an output signal of either the buffer 22a or the buffer 22b, a switching between the normal operation or the reverse rotation (the operations 1 and 2) becomes possible. By turning on both of two buffers 22a, 22b, the operation 3 becomes possible. Furthermore, by turning off the output of the inverter 21 or two buffers 22a, 22b (so as to make the output terminal have a high impedance), the operation is stopped. Accordingly, with the control performed in response to the control signal of the inverter 21 and two buffers 22a, 22b, the drive of the operations 1, 2, 3 become possible. The control of the combination of these three operations and the respective drive time enables a high-precision and rapid control of a positioning, a rotational speed and a torque using the self-oscillating circuit.

To be more specified, by changing over the operations 1, 2 or the operations 1, 3 in sequence, the apparent rotational speed is made slow. For example, the operations 1, 2 are changed over at a certain time interval continuously such as the operation 1, the operation 2, the operation 1, the operation 2. In case of a pair of the operations 1, 2, by making the operation time of either one of the operations 1, 2 longer than the other, the ultrasonic motor is rotated in one direction. Furthermore, by changing the ratio of respective operation times in sequence, the rotational speed is made slower as it approaches a target position thus enabling a high-precision position control. To the contrary, at the time of starting, the rotational speed is increased gradually so that the vibration is not applied to an appliance on which the ultrasonic motor is mounted and a slip at the contact portion between the vibrating body 6 and the moving body 8 is decreased whereby wear is restricted. In such a control, the self-oscillating circuit signal is not stopped so that a rapid position control becomes possible. Stop conditions may be inserted in the midst of respective operations.

The value of the capacitor 24 is controlled from outside by constituting a variable capacitance diode or a varactor, for example. By adjusting the phase with the capacitor 24, the oscillation frequency is adjusted and the speed of the moving body 8 is varied. Accordingly, by gradually increasing or decreasing the speed at the time of starting or stopping, a slip at the contact portion between the vibrating body 6 and the moving body 8 is minimized so that wear is restricted. By decreasing the speed in the vicinity of the target position or at the time of minute movement, a high-precision position control becomes possible. It is also possible to increase the rising speed and the stopping speed.

Figure 7:
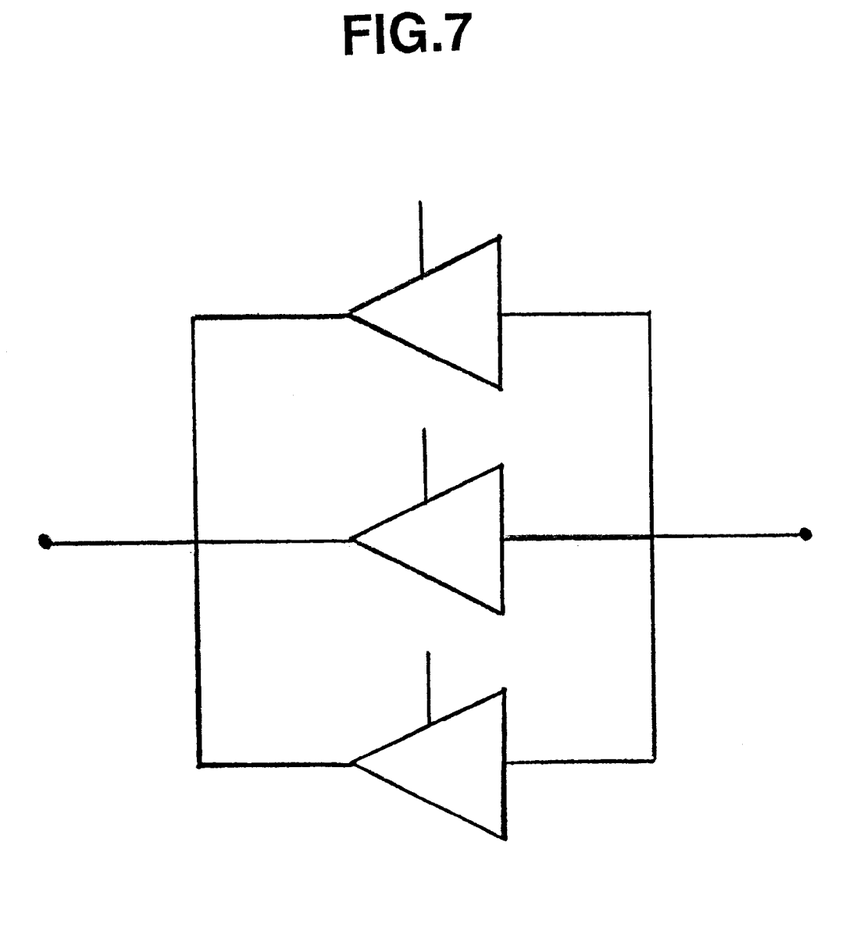
FIG. 7 is an explanatory view showing another constructional example of a drive circuit of an ultrasonic motor of the present invention.

The phase adjustment is performed at any portion which constitutes a filter besides the capacitor 24 such as the capacitor 23 or the resistor 25. FIG. 7 shows a construction where the buffer portions in FIG. 6 are arranged in parallel and respective buffers are formed in a tri-state construction. By selecting the number of buffers which is driven by a signal from outside, the drive performance of the ultrasonic motor 1 is varied. Accordingly, by varying the output of the ultrasonic motor 1, an advantage similar to that obtained by varying the capacitor is obtained. Furthermore, the similar advantage is obtained by connecting the inverter 21 in parallel.

As explained above, by varying the four operation patterns consisting of the normal rotation, the reverse rotation, the lifting and the stop and their operation times and the rotational speed of the ultrasonic motor, a rapid and high-precision position control is achieved and the lifetime of the ultrasonic motor and the electronic appliance is prolonged.

(Fifth Embodiment)

Figure 8:
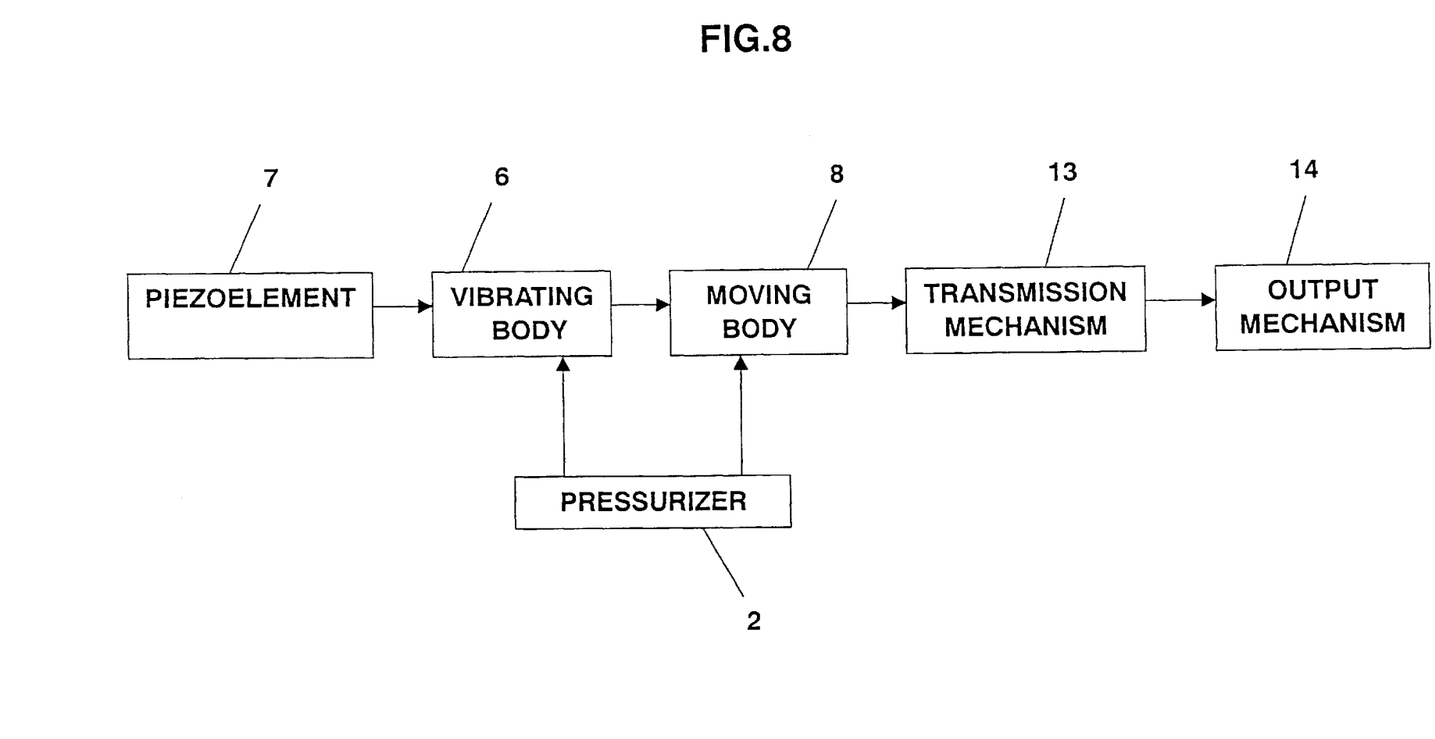
FIG. 8 is a block diagram showing an example of an electronic appliance to which an ultrasonic motor of the present invention is applied.

FIG. 8 shows a block diagram of the fifth embodiment where an ultrasonic motor of the present invention is applied to an electronic appliance.

The electronic appliance is characterized by including the previously mentioned vibrating body 6, the movable body 8 driven by the vibrating body 6, pressuring means 2 for applying a contact pressure to the moving body 8 and the vibrating body 6, a transmission mechanism 13 having its movement interlocked with the movement of the moving body 8 and an output mechanism 14 which is operated based on the operation of the transmission mechanism 13. In this embodiment, the drive and the control of the ultrasonic motor are omitted since they are described in the first to fourth embodiments.

In this embodiment, transmission wheels such as gears or friction wheels are used as the transmission mechanism 13, for example. It may be possible to directly connect the moving body 8 with the output mechanism 14 by eliminating the transmission mechanism 13. As the output mechanism 14, for example, a pointer, a pointer drive mechanism, a display board such as a calendar, or a display board drive mechanism is considered with respect to an indicator or an electronic watch, and a mirror which changes the radiating direction of laser is considered with respect to a copier or printer, and a shutter drive mechanism, a stop drive mechanism, a lens drive mechanism, a film winding mechanism or the like is considered with respect to a camera or a video camera, and slit plate or a filter which blocks or transmits light or transmits light of a specified wavelength is considered with respect to a measuring instrument or its manufacturing apparatus or a sensor, and a contact mechanism or a gap plate which varies the resistance value or the capacity value is considered with respect to a volume controller of an acoustic apparatus, and a pick up mechanism is considered with respect to a hard disc or a optical disc.

Furthermore, by constructing the ultrasonic motor such that an output shaft is mounted on the moving body 8 and the ultrasonic motor includes a power transmission mechanism which can transmit the torque from the output shaft, the drive mechanism is realized by the ultrasonic motor per se.

As has been described heretofore, by using the ultrasonic motor as a drive source of an electronic appliance, the appliance is miniaturized, the power consumption is reduced, the responsibility and the positioning resolution are enhanced, and the appliance is used in a magnetic field or in vacuum and the appliance receives the least disturbance such as vibration. Furthermore, according to the present invention, the ultrasonic motor is not responsive to a noise of an sensor signal and a positioning command signal and hence, no vibration occurs in the control system and a wasteful operation is eliminated simultaneously whereby the lifetime of the ultrasonic motor and the electronic appliance is prolonged.

Furthermore, according to the present invention, the biased wear at the contact portion between the moving body and the vibrating body is prevented and hence, the lifetime of the ultrasonic motor and the electronic appliance is prolonged and, at the same time, the reliability of starting and the like is remarkably enhanced. Furthermore, according to the present invention, the drive and the control of the ultrasonic motor are simplified, the mounting area necessary for the drive circuit and the control circuit is minimized, and the reduction of the cost is realized.

Still furthermore, according to the present invention, a slip of the moving body at the time of starting or at the stop position is reduced and hence, the wear generated is reduced whereby the lifetime of the ultrasonic motor and the electronic appliance is prolonged.

Furthermore, the electronic appliance driven by the ultrasonic motor to which the present invention is applied is realized.

What is claimed is:

1. An ultrasonic motor comprising: a control circuit to which a processed input signal is supplied for controlling at least one of a direction and speed of the motor in accordance with the processed input signal; a drive circuit for receiving a control signal output by the control circuit and outputting a drive signal in accordance therewith; a vibrating body having a piezoelectric element to which the drive signal output by the drive circuit is supplied so that vibration of the vibrating body is controlled in accordance with the control signal; a moving body driven in response to vibration of the vibrating body; a position detecting circuit for producing an output signal in accordance with a position of the moving body; and a signal processing circuit for receiving an input signal, processing the input signal by one of eliminating a frequency component thereof above a predetermined frequency level, eliminating fluctuations in level of the input signal below a predetermined value, and sampling the input signal to output a mean value thereof, and outputting the processed input signal to the control circuit so that minor fluctuations in the input signal are eliminated by the signal processing circuit and do not affect operation of the motor; wherein the control circuit includes means for comparing the processed input signal with the output signal of the position detecting circuit and producing the control signal in accordance with a difference therebetween.

2. An ultrasonic motor according to claim 1; wherein the signal processing circuit comprises a filter circuit for eliminating a component of the input signal equal to or exceeding the predetermined frequency.

3. An ultrasonic motor according to claim 1; wherein the signal processing circuit includes means for processing the input signal so that the control signal is output by the control circuit to the drive circuit only when a fluctuation in the input signal exceeds the predetermined value.

4. An ultrasonic motor according to claim 1; wherein the signal processing circuit includes means for sampling the input signal and outputting to the control circuit a mean value of the samples taken of the input signal.

5. In an electric appliance having an output mechanism for producing an output movement; an ultrasonic motor according to claim 1 for driving the output mechanism.

6. An ultrasonic motor according to claim 1; wherein the control signal comprises one of a start signal for starting movement of the moving body, a stop signal for stopping movement of the moving body, a normal movement signal for continuing movement of the moving body, and a reverse signal for reversing movement of the moving body.

7. An ultrasonic motor according to claim 1; wherein the control signal comprises one of a start signal for starting movement of the moving body, a stop signal for stopping movement of the moving body, a normal movement signal for continuing movement of the moving body, and a reverse signal for reversing movement of the moving body.

8. An ultrasonic motor according to claim 1; wherein the input signal comprises a linear signal for producing output motion of the moving body proportional to the level of the input signal.

9. An ultrasonic motor according to claim 1; wherein the input signal has three states for driving the moving body in three states comprising a moving state, a stop state, and a reverse rotation state.

10. An ultrasonic motor comprising: a control circuit to which an input signal is supplied for controlling at least one of direction and speed of the motor in accordance with the input signal; a drive circuit for receiving a control signal output by the control circuit and outputting a drive signal in accordance therewith; a vibrating body having a piezoelectric element to which the drive signal output by the drive circuit is supplied so that vibration of the vibrating body is controlled in accordance with the control signal; and a moving body driven in response to vibration of the vibrating body; wherein a drive range of the moving body is defined as a range of motion through which the moving body may be driven in response to the input signal, a possible operating range of the moving body is defined as an extent of motion through which the moving body may be driven in response to the control signal output by the control circuit, and the possible operating range of the moving body is a range which includes the full range of motion of the drive range and which exceeds the drive range; and wherein the control circuit includes means for selectively driving the moving body through the possible operating range to reduce uneven wear of components of the motor based on repetitive motion of the moving body through the drive range.

11. An ultrasonic motor according to claim 10; wherein at the time of starting a drive operation of the moving body or stopping a drive operation thereof, the control circuit drives the moving body through the possible operating range and thereafter returns the moving body to a reference position.

12. An ultrasonic motor according to claim 11; wherein the control circuit includes means for periodically changing a drive width of the possible operating range.

13. In an electric appliance having an output mechanism for producing an output movement; an ultrasonic motor according to claim 10 for driving the output mechanism.

14. An ultrasonic motor comprising: a control circuit to which an input signal is supplied for controlling at least one of a direction and a speed of the motor in accordance with the input signal; a drive circuit for receiving a control signal output by the control circuit and outputting a drive signal in accordance therewith; a vibrating body having a piezoelectric element to which the drive signal output by the drive circuit is supplied so that vibration of the vibrating body is controlled in accordance with the control signal; a moving body driven in response to vibration of the vibrating body; and a plurality of groups of electrode patterns formed on the piezoelectric element each for generating a different standing wave in the vibrating body so that by selecting a respective group of electrode patterns to which the drive signal is to be applied, a moving direction, a rotational speed and a torque of the moving body may be changed; wherein the control circuit includes means for selecting more than one group of electrode patterns to stop movement of the moving body.

15. An ultrasonic motor according to claim 14; wherein the control circuit includes means for stopping the drive signal output by the drive circuit from being applied to the respective groups of electrode patterns and for applying the drive signal to a plurality of the groups of the electrode patterns simultaneously.

16. An ultrasonic motor according to claim 14; the drive circuit and the vibrating body constitute a self-oscillating circuit, and the self-oscillating circuit generates an alternating current signal for producing a standing wave in the vibrating body.

17. An ultrasonic motor according to claim 16; wherein at the time of starting the moving body to move or stopping the moving body from moving, at least one of a voltage and a frequency of the drive signal applied to the piezoelectric element is varied.

18. In an electric appliance having an output mechanism for producing an output movement; an ultrasonic motor according to claim 14 for driving the output mechanism.

19. An ultrasonic motor comprising: a drive circuit for producing a drive signal in accordance with, a processed input signal; a piezoelectric element for receiving the drive signal; a vibrating body attached to the piezoelectric element to undergo vibration in accordance with. the drive signal; a moving body in contact with the vibrating body to undergo movement in response to vibration of the vibrating body; and a signal processing circuit for receiving an input signal, processing the input signal by one of eliminating a frequency component thereof above a predetermined frequency level, eliminating fluctuations in level of the input signal below a predetermined value, and sampling the input signal to output a mean value thereof, and outputting the processed input signal to the driving circuit so that minor fluctuations in the input signal are eliminated by the signal processing circuit and do not affect operation of the motor; wherein a first range of motion through which the moving body may be moved in response to the input signal is smaller than a second range of motion through which the moving body may be moved in response to the control signal; and wherein the control circuit includes means for selectively driving the moving body through the second range of motion to prevent uneven component wear based on repetitive motion of the moving body through the first range of motion; and wherein the signal processing circuit includes means for sampling the input signal and outputting to the driving circuit a mean value of the samples taken of the input signal.

20. An ultrasonic motor according to claim 19; wherein the drive circuit comprises a control circuit for outputting a control signal to control at least one of a direction and a speed of the moving body, and a self-oscillation circuit for driving the moving body according to the control signal.

21. An ultrasonic motor according to claim 19; wherein when starting a drive operation of the moving body or stopping a drive operation thereof, the control circuit drives the moving body through the second range of motion and thereafter returns the moving body to a reference position.

22. An ultrasonic motor according to claim 19; wherein the control circuit includes means for periodically changing a drive width of the second range of motion.

23. An ultrasonic motor according to claim 19; wherein the signal processing circuit comprises a filter circuit for eliminating a component of the input signal equal to or exceeding the predetermined frequency.

24. An ultrasonic motor according to claim 19; wherein the signal processing circuit includes means for processing the input signal so that the drive signal is applied to the piezoelectric element only when a fluctuation in the input signal exceeds the predetermined value.

\* \* \* \* \*